United States Patent
Sekozawa et al.

(10) Patent No.: US 10,589,689 B2
(45) Date of Patent: Mar. 17, 2020

(54) INTERIOR MEMBER

(71) Applicant: Kumi Kasei Co., Ltd., Tokyo (JP)

(72) Inventors: Hirokazu Sekozawa, Suzuka (JP); Kunio Watanabe, Utsunomiya (JP); Hiroyuki Okonogi, Utsunomiya (JP)

(73) Assignee: Kumi Kasei Co., Ltd., Tokyo (JP)

( * ) Notice: Subject to any disclaimer, the term of this patent is extended or adjusted under 35 U.S.C. 154(b) by 0 days.

(21) Appl. No.: 16/085,753

(22) PCT Filed: Mar. 17, 2017

(86) PCT No.: PCT/JP2017/010909
§ 371 (c)(1),
(2) Date: Sep. 17, 2018

(87) PCT Pub. No.: WO2017/164116
PCT Pub. Date: Sep. 28, 2017

(65) Prior Publication Data
US 2019/0299868 A1 Oct. 3, 2019

(30) Foreign Application Priority Data
Mar. 24, 2016 (JP) .................................. 2016-060714

(51) Int. Cl.
*B60R 7/04* (2006.01)
*F16B 5/02* (2006.01)
*B60N 3/10* (2006.01)

(52) U.S. Cl.
CPC .................. *B60R 7/04* (2013.01); *F16B 5/02* (2013.01); *B60N 3/10* (2013.01)

(58) Field of Classification Search
CPC ................ B60R 7/04; B60N 3/10; F16B 5/02
(Continued)

(56) References Cited

U.S. PATENT DOCUMENTS

2007/0200380 A1 8/2007 Stolarczyk et al.
2008/0157551 A1* 7/2008 Baum ................. B60C 23/0408
296/1.07
2011/0299955 A1* 12/2011 Sato ....................... B60R 11/00
411/103

FOREIGN PATENT DOCUMENTS

JP S52-103524 U 8/1977
JP S59-046725 U 3/1984
(Continued)

OTHER PUBLICATIONS

International Search Report and Written Opinion for International Application No. PCT/JP2017/010909, dated May 16, 2017.

*Primary Examiner* — Joseph D. Pape
*Assistant Examiner* — Dana D Ivey
(74) *Attorney, Agent, or Firm* — Wolf, Greenfield & Sacks, P.C.

(57) ABSTRACT

An interior member for attachment to a car body configuring member includes a fixing tool to fix the interior member to the car body configuring member, a base portion with a through-hole which allows the fixing tool to pass therethrough, and a movement restricting portion that protrudes from an outer surface of the base portion. The fixing tool has a head disposed on the outer surface, and a shaft extending from the head and fixed to the car body configuring member through the through-hole. The interior member is displaceable in a direction along the outer surface of the base portion within a predetermined area in a state where part of the car body configuring member or the fixing tool is inserted. The movement restricting portion has an abutting portion which restricts movement of the head in the direction along the outer surface.

5 Claims, 8 Drawing Sheets

(58) Field of Classification Search
 USPC .......................................................... 296/1.07
 See application file for complete search history.

(56) References Cited

FOREIGN PATENT DOCUMENTS

| | | |
|---|---|---|
| JP | H08-072547 A | 3/1996 |
| JP | 2002-316572 A | 10/2002 |
| JP | 2004-009991 A | 1/2004 |
| WO | WO 2010/095345 A1 | 8/2010 |

\* cited by examiner

INTERIOR MEMBER

TECHNICAL FIELD

The present invention relates to an interior member.

Priority is claimed on Japanese Patent Application No. 2016-060714, filed on Mar. 24, 2016, the content of which is incorporated herein by reference.

BACKGROUND ART

An interior member (for example, a cup holder) for a vehicle is attached to a car body configuring member (for example, a door) by a fixing tool such as a screw fixing tool (for example, refer to Patent Documents 1 and 2). The fixing tool is fixed to the car body configuring member, for example, through a through-hole provided in the interior member.

PRIOR ART DOCUMENTS

Patent Documents

[Patent Document 1] PCT International Publication No. WO2010/95345

[Patent Document 2] Japanese Unexamined Patent Application, First Publication No. 2002-316572

DISCLOSURE OF INVENTION

Problems to be Solved by the Invention

In a structure of the related art, when attaching the interior member to the car body configuring member, it is necessary to dispose the interior member at a predetermined position in some cases through an operation of displacing the interior member with respect to the car body configuring member in a state where part of the ear body configuring member or the fixing tool has passed through the through-hole in the interior member. In this case, it is necessary for the through-hole to have a size that allows only displacement of the interior member.

However, if the through-hole is large, the position of the interior member is likely to change. For this reason, it is difficult to accurately dispose the interior member at a position designed in advance in some cases.

In view of such circumstances, an object of the invention is to provide an attachment structure of an interior member, which allows the interior member to be disposed at an accurate position with respect to a car body configuring member and makes an attaching operation of the interior member easy.

SUMMARY OF THE INVENTION

According to a first aspect of the present invention, there is provided an interior member configured to be attached to a car body configuring member. The interior member includes a fixing tool that is configured to fix the interior member in the car body configuring member, a base portion that has a through-hole which allows the tool to pass therethrough, and a movement restricting portion that protrudes from an outer surface of the base portion, which is opposite to a surface on a car body configuring member side. The fixing tool has a head which is disposed on the outer surface of the base portion and a shaft which extends from the head and is fixed to the car body configuring member through the through-hole. The through-hole is formed such that the interior member is displaceable in a direction along the outer surface of the base portion within a predetermined area in a state where part of the car body configuring member or the fixing tool is inserted. The movement restricting portion has an abutting portion which restricts movement of the head in the direction along the outer surface of the base portion.

In the first aspect, a wall that stands from the outer surface of the base portion may be further included, and the movement restricting portion may be formed to protrude from the wall.

In the first aspect, the movement restricting portion may be a rib-like projection formed on the wall.

In the first aspect, the wall may be a stepped portion formed on the outer surface of the base portion.

In the first aspect, the wall may be formed by a plate-like projection protruding from the outer surface of the base portion.

In the first aspect, the base portion may be attached to a first main surface of the car body configuring member, and at least part of the base portion may be exposed to a second main surface side of the car body configuring member, which is opposite to the first main surface, through an opening formed in the car body configuring member.

In the first aspect, the base portion may be attached to the car body configuring member with a clearance secured over an entire periphery of a peripheral edge of the opening.

Effects of the Invention

According to the aspect of the present invention, the movement restricting portion abutting against the head of the fixing tool is provided in the interior member. For this reason, the interior member can be accurately disposed at a position designed in advance. In addition, the through-hole of the interior member is formed such that the interior member is displaceable in a state where a part of the car body configuring member is inserted. For this reason, an operation of disposing the interior member at a predetermined position is easy.

Therefore, the interior member can be provided at an accurate position with respect to the car body configuring member, and an operation of attaching the interior member to the car body configuring member can be easily performed.

DESCRIPTION OF THE PREFERRED EMBODIMENTS

Next, embodiments of the present invention will be described based on the drawings.

Attachment Structure of Interior Member

Figure 1:
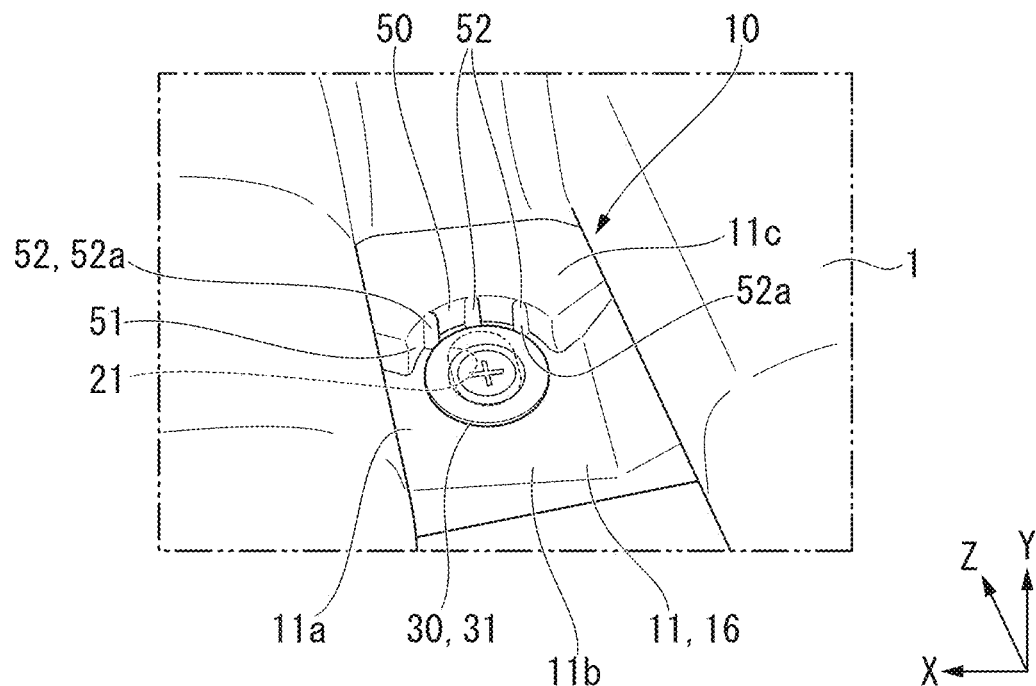
FIG. 1 is a perspective view of an attachment structure of an interior member according to a first embodiment of the present invention.
Figure 2:
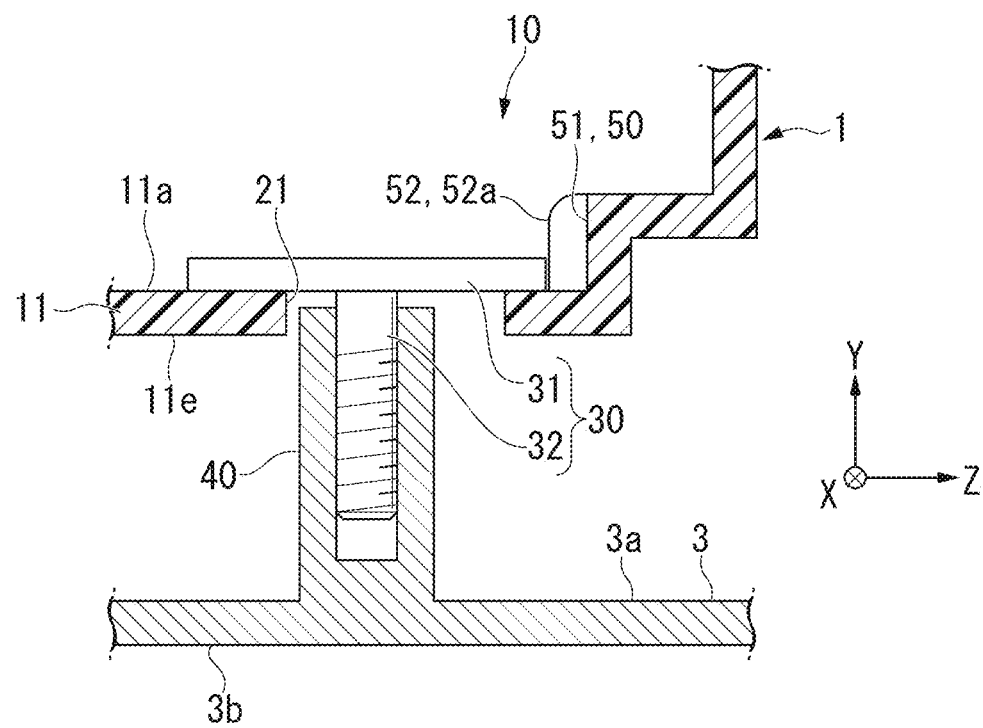
FIG. 2 is a sectional view schematically illustrating the attachment structure of FIG. 1.
Figure 3:
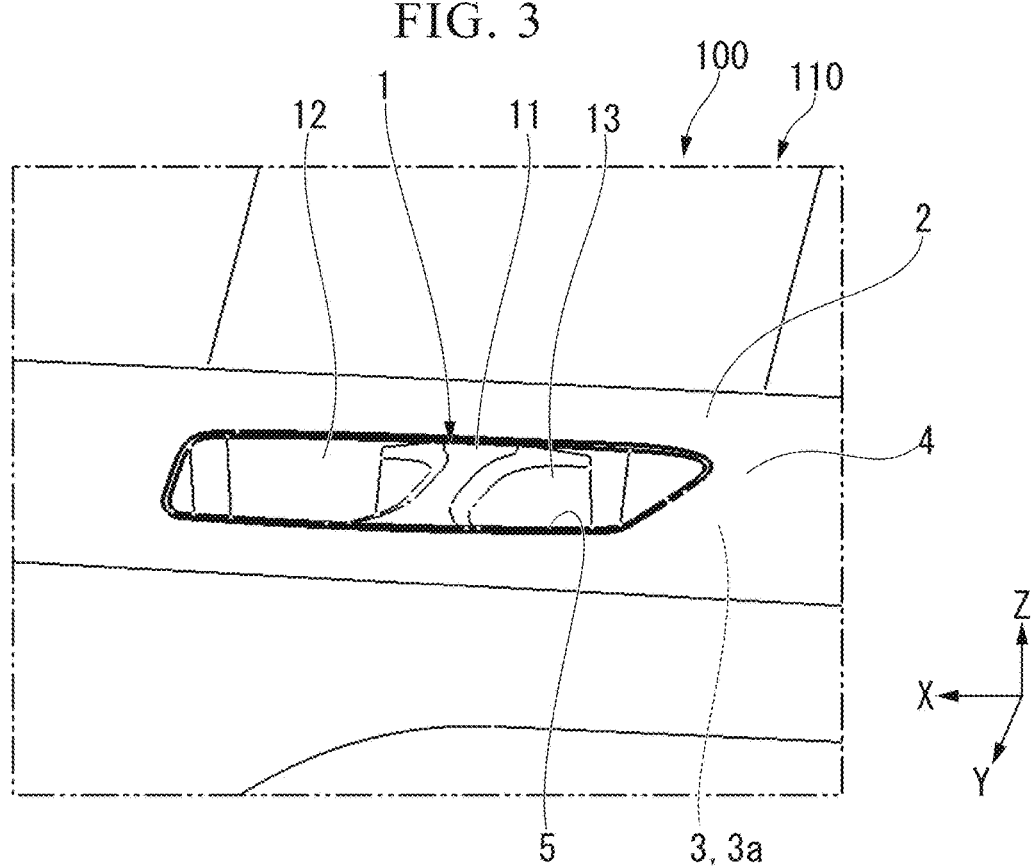
FIG. 3 is a perspective view of the interior member attached to a car body configuring member, which is seen from an inside of a car.
Figure 4:
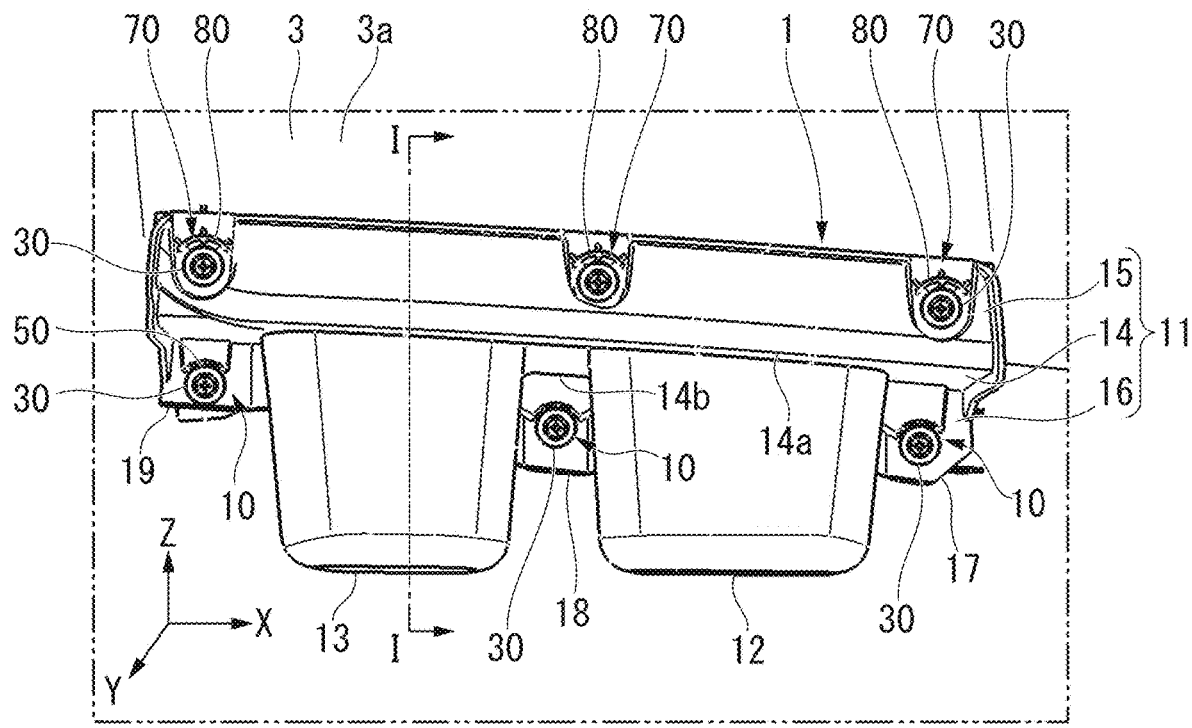
FIG. 4 is a perspective view of the interior member attached to the car body configuring member, which is seen from an outside of the car.
Figure 5:
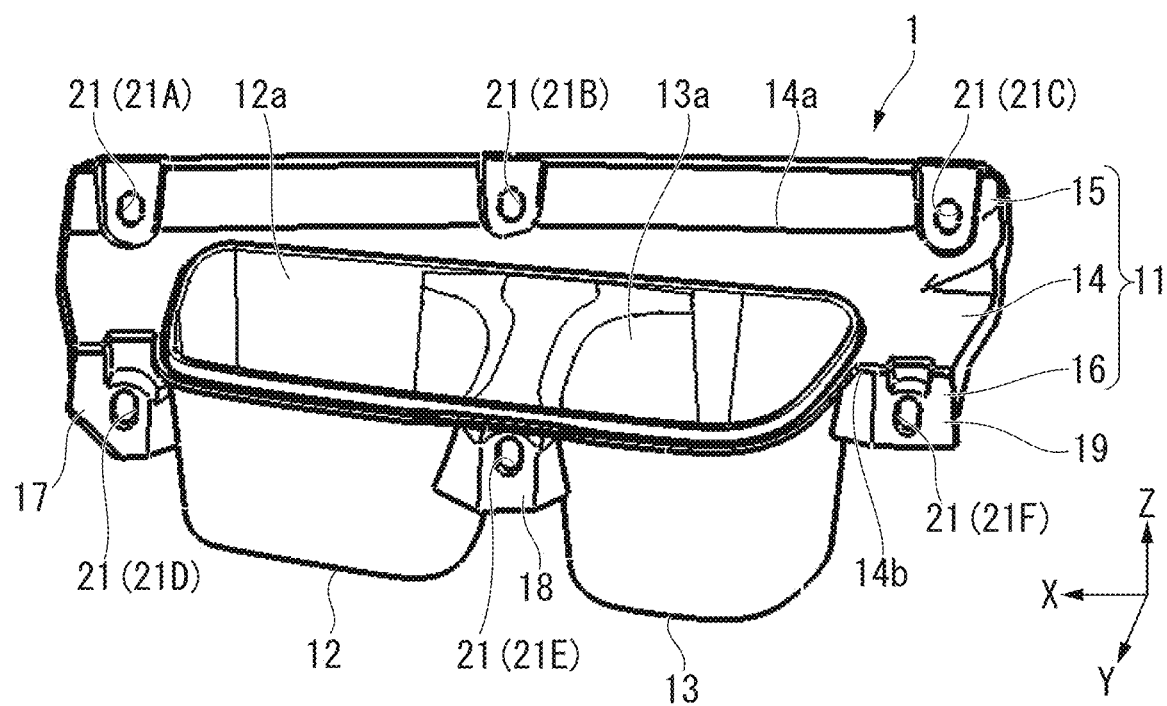
FIG. 5 is a perspective view of the interior member.
Figure 6:
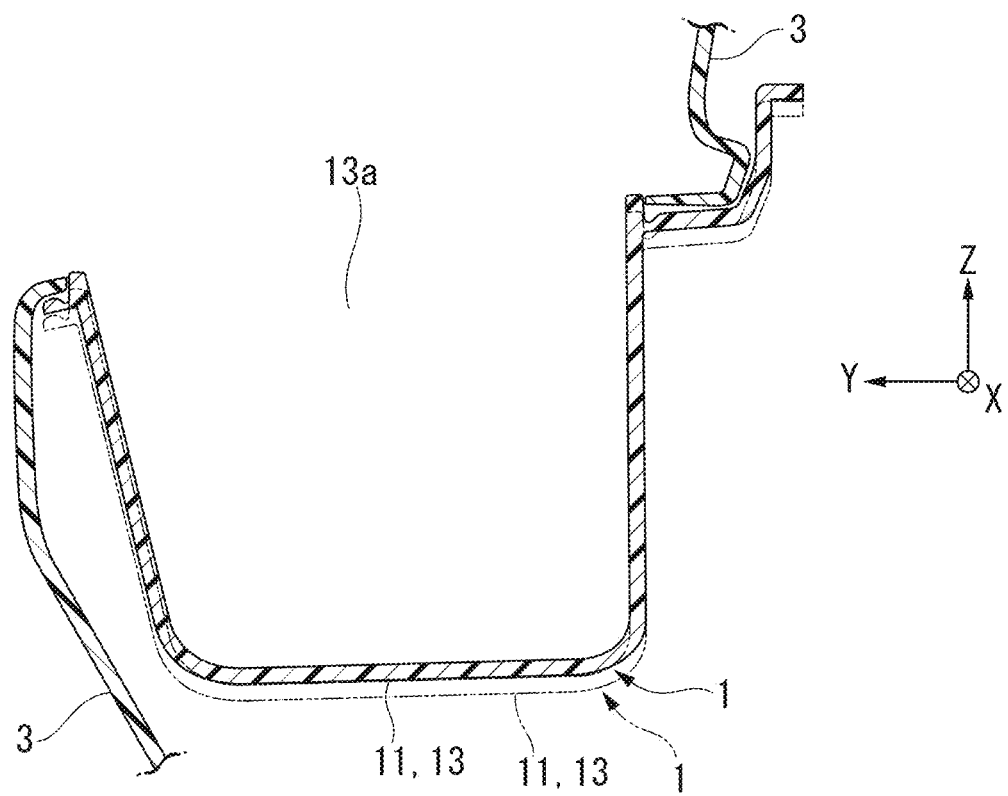
FIG. 6 is a sectional view taken along line I-I of FIG. 4.

FIG. 1 is a perspective view of an attachment structure 10 of an interior member according to a first embodiment of the present invention. FIG. 2 is a sectional view schematically illustrating the attachment structure 10 of FIG. 1. FIG. 3 is a perspective view of an interior member 1 and a door 2, which are seen from the inside of a car. FIG. 4 is a perspective view of the interior member 1 seen from the outside of the car (for example, a side of an attaching surface 3a of a panel 3). FIG. 5 is a perspective view of the interior member 1. FIG. 6 is a sectional view taken along I-I line of FIG. 4.

In the description below, an XYZ-orthogonal coordinate system is used in some cases. An X-direction is a front-and-rear direction. A Y-direction is a direction orthogonal to the X-direction and is a car-width direction. A Z-direction is a direction orthogonal to the X-direction and the Y-direction, and is an up-and-down direction.

As illustrated ire FIGS. 3 and 4, the attachment structure 10 is a structure in which the interior member 1 is attached to the panel 3 (car body configuring member) of the door 2. That is, the interior member 1 is attached to the panel 3 (car body configuring member) of the door 2 via the attachment structure 10. As illustrated in FIG. 3, the interior member 1 is attached to, for example, an inside (the rear side) of an armrest 4 of the door 2.

As illustrated in FIG. 5, the interior member 1 includes a base portion 11, a first accommodating unit 12, and a second accommodating unit 13. The first accommodating unit 12 and the second accommodating unit 13 are provided in the base portion 11.

The interior member 1 is a component provided in a car body 110 of a vehicle 100, and is, for example, a cup holder or a glove compartment.

The base portion 11 includes a long-plate-like main plate portion 14, an outside plate 15, and an inside plate 16. The outside plate 15 is erected on an outside edge 14a (one side edge, or a first side edge) of the main plate portion 14. The inside plate 16 hangs down from an inside edge 14b (the other side edge, or a second side edge) of the main plate portion 14. The outside edge 14a and the inside edge 14b oppose each other along long sides of the main plate portion 14. The main plate portion 14 is formed, for example, along a substantially XY-plane.

The outside plate 15 is formed in a length direction of the outside edge 14a of the main plate portion 14.

The inside plate 16 includes a front plate 17, a middle plate 18, and a rear plate 19. On the inside edge 14b of the main plate portion 14, the front plate 17 is formed in a portion in front of the first accommodating unit 12. The middle plate 18 is formed in a portion at the rear of the first accommodating unit 12 and in front of the second accommodating unit 13. The rear plate 19 is formed in a portion at the rear of the second accommodating unit 13.

A plurality of through-holes 21 into which fixing tools 30 are inserted are formed at locations in the outside plate 15 at intervals in the length direction (front-and-rear direction). Specifically, the through-holes 21 (21A to 21C) are formed at three locations close to a top edge of the outside plate 15 at intervals in the length direction (front-and-rear direction).

The through-holes 21 (21D to 21F) into which the fixing tools 30 are inserted are formed in the front plate 17, the middle plate 18, and the rear plate 19, respectively.

As illustrated in FIG. 2, each of the through-holes 21 has an internal dimension sufficiently larger than an external dimension of each receiving portion 40 (or each shaft 32 of the fixing tool 30) inserted into the through-hole 21. For this reason, in a state where the receiving portions 40 (or the shaft 32 of the fixing tool 30) are inserted in the through-holes 21, the interior member 1 is formed to be displaceable along an outer surface 11a of the base portion 11 within a predetermined area.

Figure 15A:
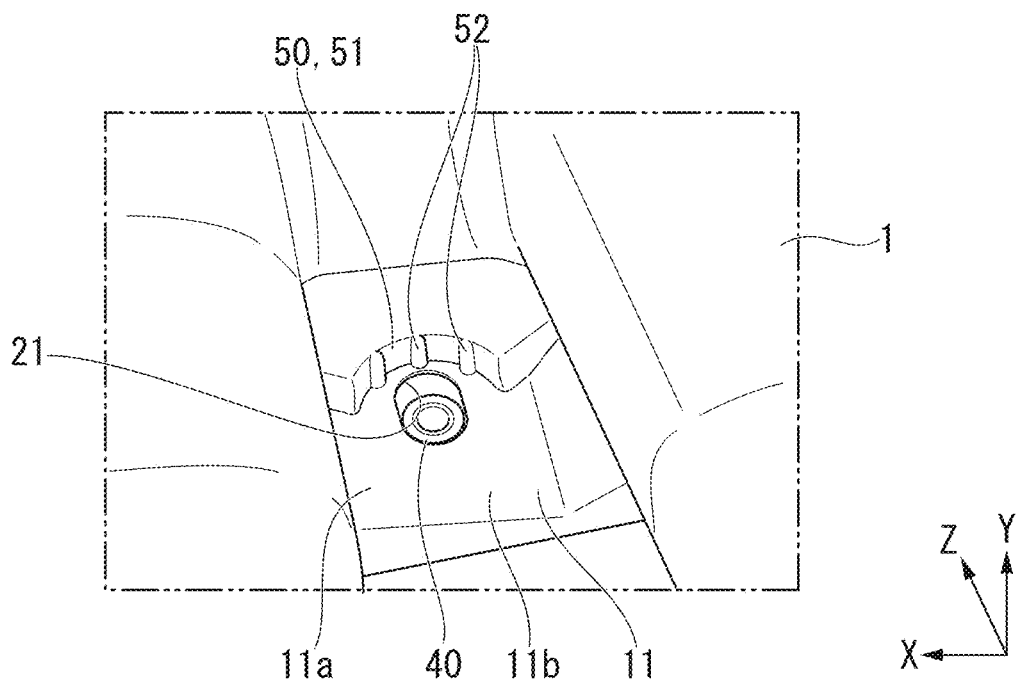
FIG. 15A is an explanatory view of the attaching operation subsequent to FIG. 14.
Figure 15B:
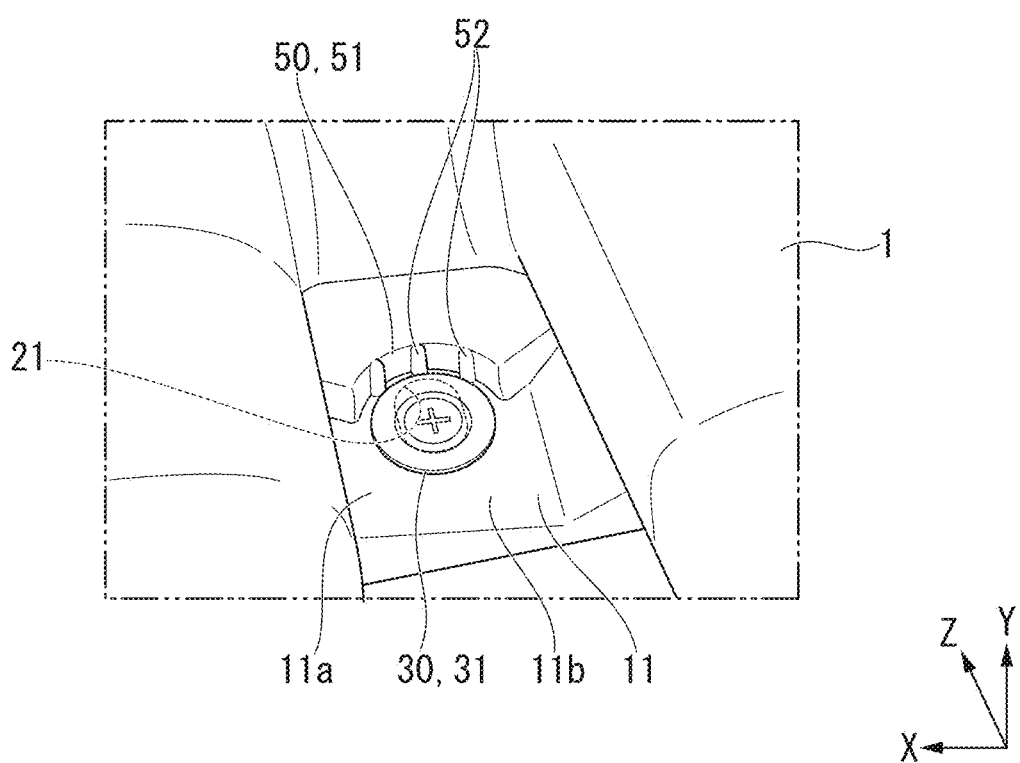
FIG. 15B is an explanatory view of the attaching operation subsequent to FIG. 15A.

The through-holes 21 are formed in, for example, an oval shape in the up-and-down direction (refer to FIGS. 1 and 15A). That is, a section of each of the through-holes 21 along an XZ-plane, is formed in, for example, an oval shape in the up-and-down direction. For this reason, the interior member 1 can be displaced in the up-and-down direction in the XZ-plane. For example, the interior member 1 is displaceable within an area between a position where the receiving portion 40 abuts an upper end of the through-hole 21 and a position where the receiving portion 40 abuts a lower end of the through-hole 21. That is, the interior member 1 is displaceable within an area between a position where the receiving portion 40 abuts the upper end of the through-hole 21 in the up-and-down direction of the car body and a position where the receiving portion 40 abuts the lower end of the through-hole 21 in the up-and-down direction of the car body.

Each of inner diameter dimensions of the through-holes 21 is formed to have a size that allows the interior member 1 to be displaceable in a state where the receiving portions 40 are inserted. For this reason, the position of the interior member 1 can be easily adjusted.

The outer surface 11a of the base portion 11 may be a surface along the XZ-plane. The outer surface 11a is a surface opposite to a surface 11e (refer to FIG. 2) of the base portion 11 on a panel 3 side. That is, in the specification, the surface opposite to the surface 11e that is close to the panel 3, out of surfaces of the base portion 11 along the XZ-plane, is referred to as the outer surface 11a of the base portion 11.

As illustrated in FIG. 5, the first accommodating unit 12 is formed in a container shape and is integrally formed with the main plate portion 14 with an opening 12a facing upwards. The second accommodating unit 13 is formed in a container shape and is integrally formed with the main plate portion 14 with an opening 13a facing upwards. The second accommodating unit 13 is formed at a position separated apart from the first accommodating unit 12 rearwards.

As illustrated in FIGS. 3 and 4, the interior member 1 (base portion 11) is attached to the attaching surface 3a (first main surface) of the panel 3 of the door 2 by the fixing tools 30.

Figure 7:
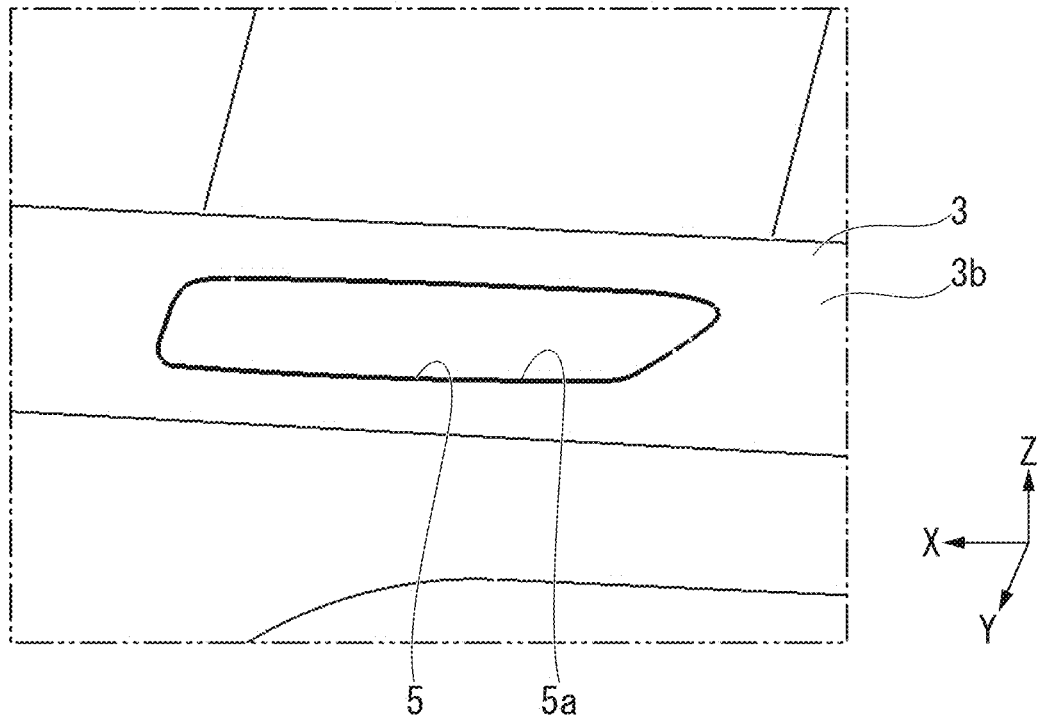
FIG. 7 is a perspective view of the car body configuring member to which the interior member is to be attached.
Figure 8:
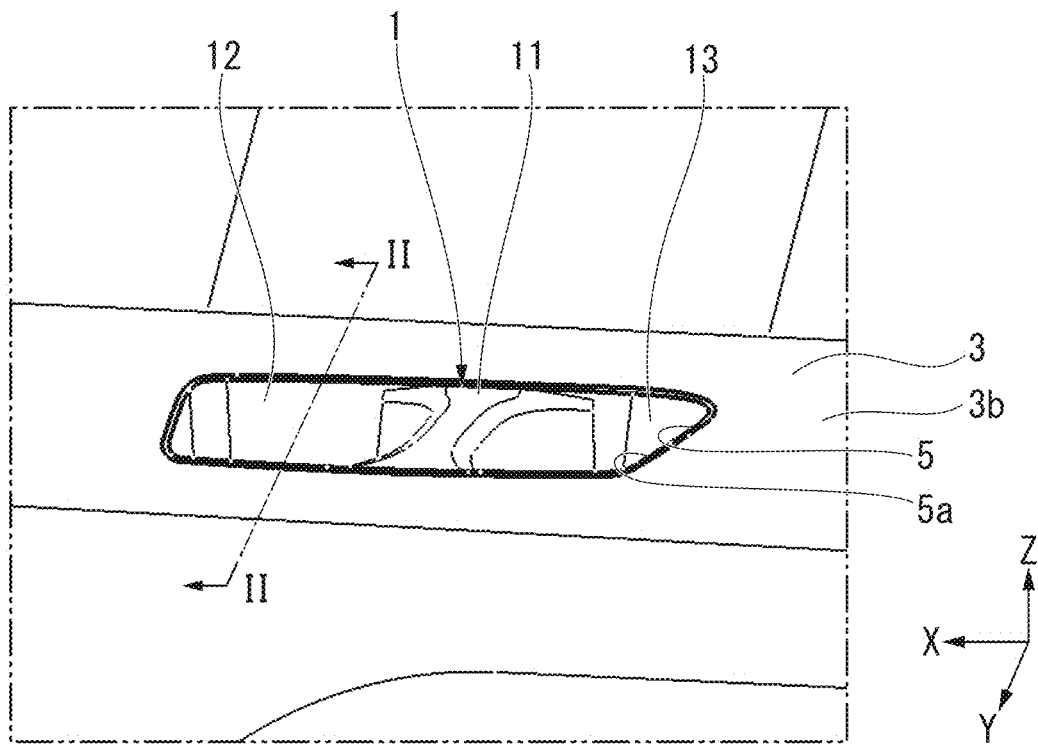
FIG. 8 is a perspective view of the car both configuring member to which the interior member is attached.

As illustrated in FIG. 7, an opening 5 is formed in the panel 3. As illustrated in FIG. 8, the opening 5 exposes at least part of the interior member 1 (base portion 11) to a car inside surface 3b (second main surface).

As illustrated in FIG. 3, when the door 2 on which the interior member 1 is attached to the attaching surface 3a of the panel 3 is seen from the inside of the car, the door 2 has a configuration where the first accommodating unit 12 and the second accommodating unit 13 of the interior member 1 are exposed to the opening 5 formed in the armrest 4.

Figure 11:
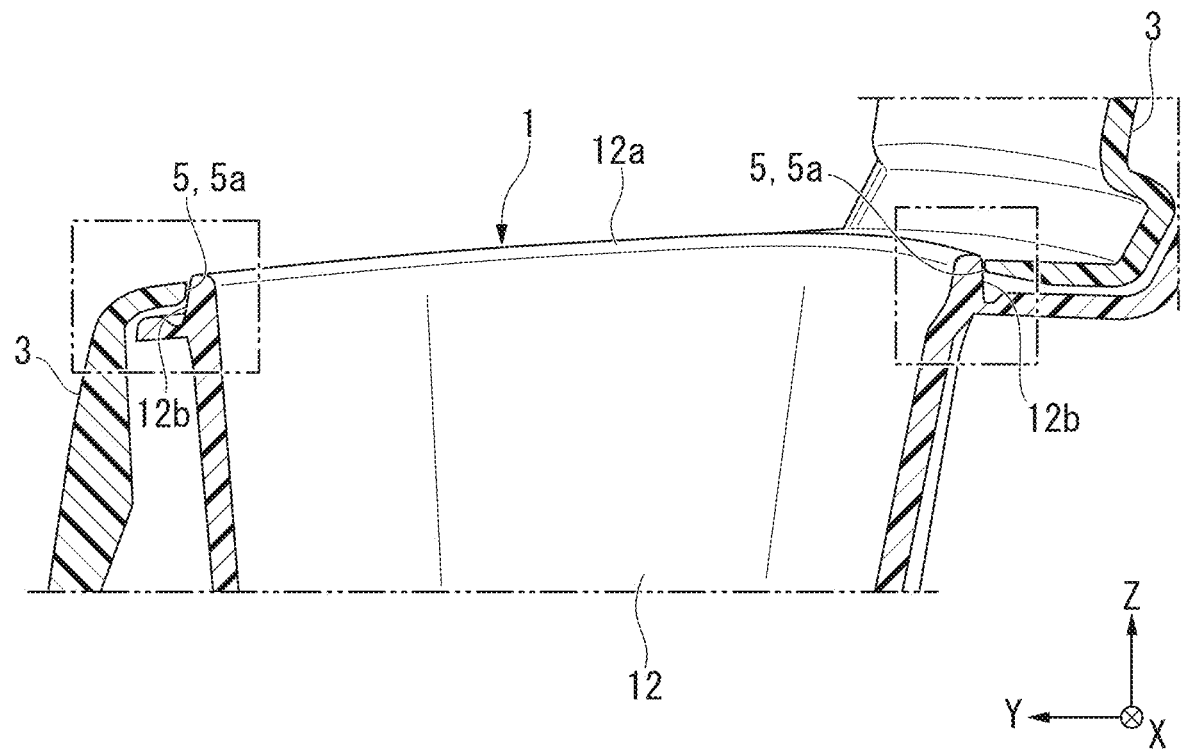
FIG. 11 is a sectional view taken along line II-II of FIG. 8.
Figure 12:
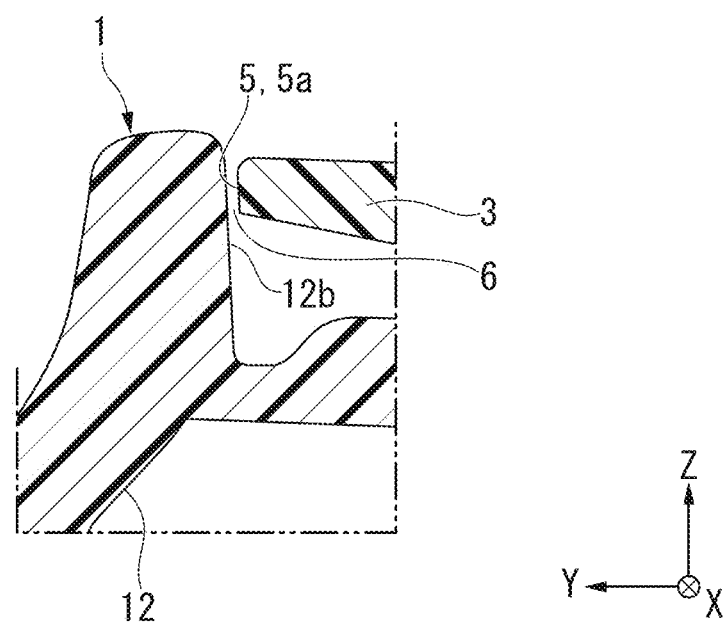
FIG. 12 is an enlarged sectional view of FIG. 11.
Figure 13:
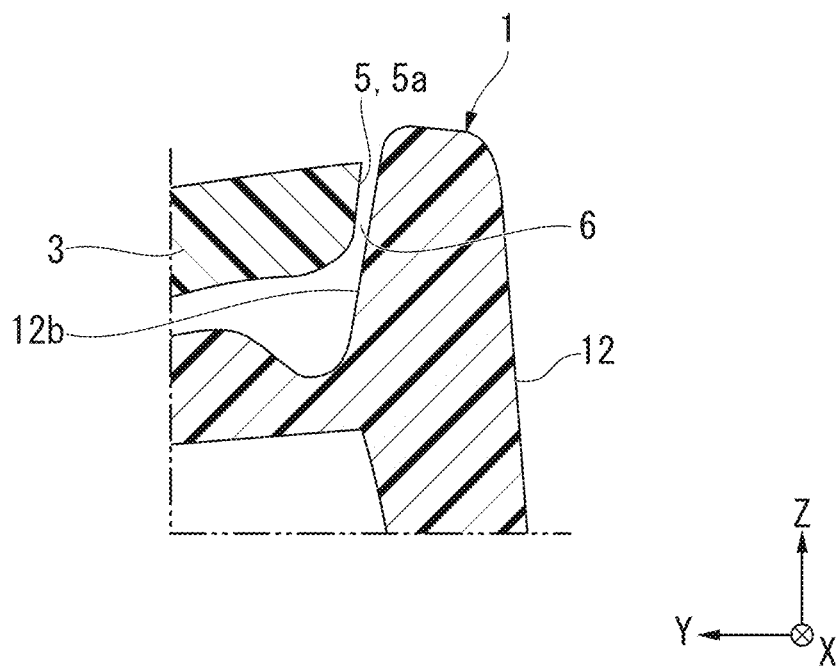
FIG. 13 is an enlarged sectional view of FIG. 11.

FIG. 11 is a sectional view of the interior member 1 and the panel 3. FIGS. 12 and 13 are enlarged views of a part of FIG. 11.

As illustrated in FIGS. 11 to 13, it is preferable to attach the interior member 1 to the panel 3 after securing a clearance 6 with respect to a peripheral edge 5a of the opening 5 of the panel 3. For example, as illustrated in FIGS. 12 and 13, it is preferable that the clearance 6 be secured between an outer peripheral edge 12b of the first accommodating unit 12 and the peripheral edge 5a of the opening 5.

It is preferable that the clearance 6 between the interior member 1 and the peripheral edge 5a of the opening 5 be constant over the entire periphery of the opening 5. It is preferable that the clearance 6 be as small as possible.

As illustrated in FIG. 2, each of the fixing tools 30 includes a head 31 and the shaft 32. The shaft 32 extends from the head 31. The head 31 is formed to have a disk shape. The head 31 is disposed along the outer surface 11a of the base portion 11. The shaft 32 is, for example, a screw shaft in which male screws are formed. The shaft 32 of each of the fixing tool 30 is inserted into each of the through-holes 21.

On the attaching surface 3a of the panel 3 of the door 2, the receiving portions 40 to which the fixing tools 30 are fixed are provided to protrude from the attaching surface 3a. The receiving portions 40 are formed in, for example, a cylindrical shape. The shaft 32 of the fixing tool 30 are inserted into the receiving portions, and then the shaft is screwed. Each of the receiving portions 40 may have a shape protruding perpendicularly to the attaching surface 3a.

As illustrated in FIG. 4, the inside plate 16 of the base portion 11 of the interior member 1 is attached to the panel 3 by the attachment structure 10 of the first embodiment. The outside plate 15 of the base portion 11 is attached to the panel 3 by an attachment structure 70 of a second embodiment to be described later.

As illustrated in FIGS. 1 and 2, in the attachment structure 10 of the first embodiment, the outer surface 11a of the base portion 11 has walls 50 and rib-like projections 52 (movement restricting portions). The walls 50 stand from the outer surface 11a. The rib-like projections 52 are formed on each of wall surfaces 51, which are inside surfaces of the walls 50.

Each of the walls 50 is a stepped portion formed by a difference of elevation between a bottom surface 11b of the base portion 11 and an upper surface 11c formed at a position higher than that of the bottom surface 11b in the Y-direction (protruding direction).

The shape of each of the walls 50 (wall surfaces 51) in plan view of a surface along the bottom surface 11b (XZ-plane) is a curved shape (for example, an arc shape), The height of each of the walls 50 with respect to the bottom surface 11b can be made constant in an extending direction (circumferential direction).

The shape of each of the walls 50 in the XZ-plane may be a shape along the shape of the head 31 of the fixing tool 30. The shape of each of the walls 50 (wall surfaces 51) in the XZ-plane can be set as, for example, an arc shape along an outer circumferential edge of the head 31 having a circular plate shape, as illustrated in FIG. 1.

The rib-like projections 52 are formed by protruding from each of the wall surfaces 51 toward the center of a circle of an arc formed by each of the wall surfaces 51. The sectional shape of each of the rib-like projections 52 along the XZ-plane may be an arc shape, a semicircular shape, or a rectangular shape. The rib-like projections 52 are formed to extend in a height direction (Y-direction) of the walls 50. Each of protruding ends 52a of the rib-like projections 52 is an abutting portion abutting against the head 31 of the fixing tool 30.

The height and the forming position of each of the rib-like projections 52 are set such that the interior member 1 is disposed at a design position when the outer peripheral edge of the head 31 of the fixing tool 30 has abutted the protruding end 52a of the rib-like projection 52.

It is preferable that the plurality of rib-like projections 52 be formed at intervals in the extending direction (circumferential direction) of the walls 50. The protruding heights of the plurality of rib-like projections 52 from the wall surfaces 51 may be the same.

In the embodiment, the number of the rib-like projections 52 formed for one wall 50 is three. The number of the rib-like projections 52 formed for one wall 50 can be set to, for example, two to five. It is preferable to set the protruding heights of the plurality of rib-like projections 52 such that all of the protruding ends 52a of the rib-like projections 52 abut against the heads 31 of the fixing tools 30.

Second Embodiment

Figure 9:
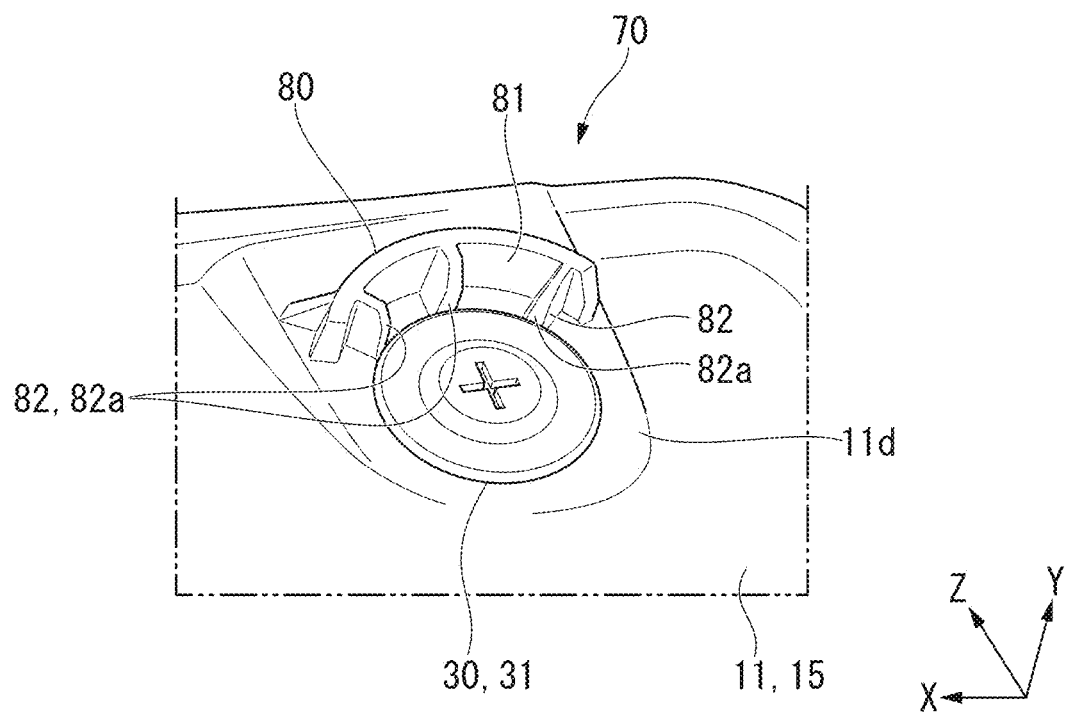
FIG. 9 is a perspective view of an attachment structure of an interior member according to a second embodiment of the present invention.
Figure 10:
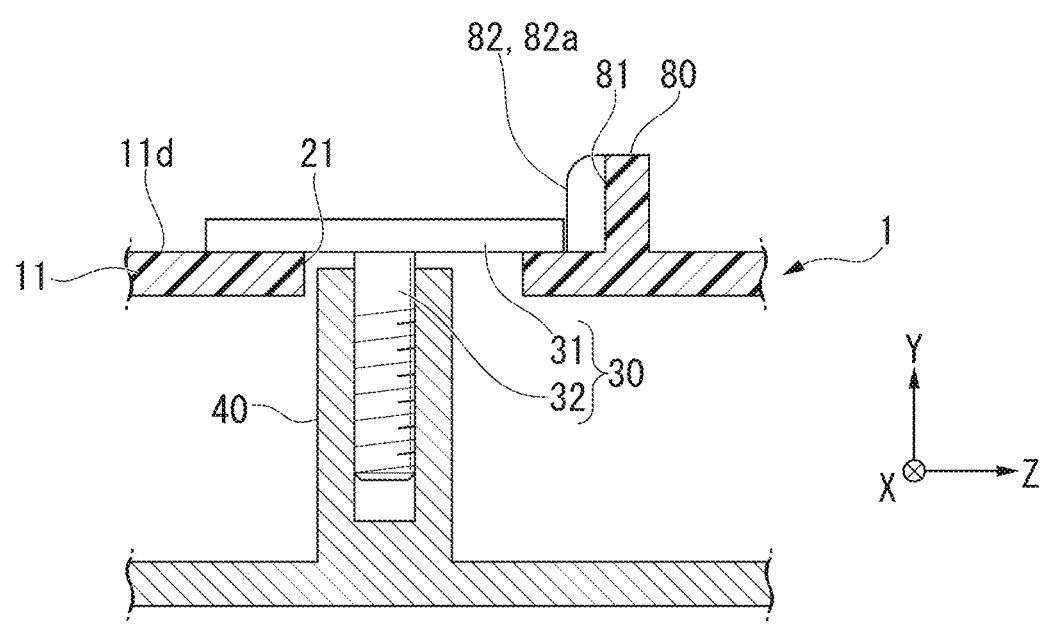
FIG. 10 is a sectional view schematically illustrating the attachment structure of the previous drawing.

FIG. 9 is a perspective view of the attachment structure 70 of an interior member according to the second embodiment of the present invention. FIG. 10 is a sectional view schematically illustrating the attachment structure 70.

The attachment structure 70 of the embodiment has the same configuration as that of the first embodiment excluding configuration elements to be described below.

As illustrated in FIGS. 9 and 10, the attachment structure 70 has walls 80 and rib-like projections 82 (movement restricting portions).

The walls 80 stand on an outer surface 11d of the base portion 11 from the outer surface 11d. Each of the walls 80 is a plate-like projection protruding from the outer surface 11d.

The shape of each of the walls 80 (wall surfaces 81) in plan view (shape in the XZ-plane) is a curved shape (for example, an arc shape). The height of the walls 80 can be made constant in an extending direction (circumferential direction).

The shape of each of the walls 80 in the XZ-plane can be set to a shape along the shape of the head 31 of the fixing tool 30. The shape of each of the walls 80 (wall surfaces 81) in the XZ-plane can be set as, for example, an arc shape along the outer circumferential edge of the head 31 having a circular plate shape.

The rib-like projections 82 are formed on each of the wall surfaces 81, which are inside surfaces of the walls 80. The rib-like projections 82 are formed by protruding from each of the wall surfaces 81 toward the center of a circle of an arc formed by each of the wall surfaces 81. The sectional shape of each of the rib-like projections 82 along the XZ-plane may be an arc shape, a semicircular shape, or a rectangular shape. The rib-like projections 82 are formed to extend in a height direction (Y direction) of the walls 80. Each of protruding ends 82a of the rib-like projections 82 is an abutting portion abutting against the head 31 of the fixing tool 30.

The height and the forming position of each of the rib-like projections 82 are set such that the interior member 1 is disposed at a design position with respect to the panel 3 when the outer circumferential edge of the head 31 of the fixing tool 30 has abutted the protruding end 82a of the rib-like projection 82.

It is preferable that the plurality of rib-like projections 82 be formed at intervals in the extending direction (circumferential direction) of the walls 80. The protruding heights of the plurality of rib-like projections 82 from the wall surfaces 81 may be the same.

In the embodiment, the number of the rib-like projections 82 formed for one wall 80 is three. The number of the rib-like projections 82 formed for one wall 80 can be set to, for example, two to five. It is preferable to set the protruding heights of the plurality of rib-like projections 82 such that all of the protruding ends 82a of the rib-like projections 82 abut against the heads 31 of the fixing tools 30.

Attachment of Interior Member

Next, a method of attaching the interior member 1 to the panel 3 of the door 2 according to the first and second embodiments will be described. The method has a primary assembling step (first step) and a secondary assembling step (second step).

Primary Assembling Step

Figure 14:
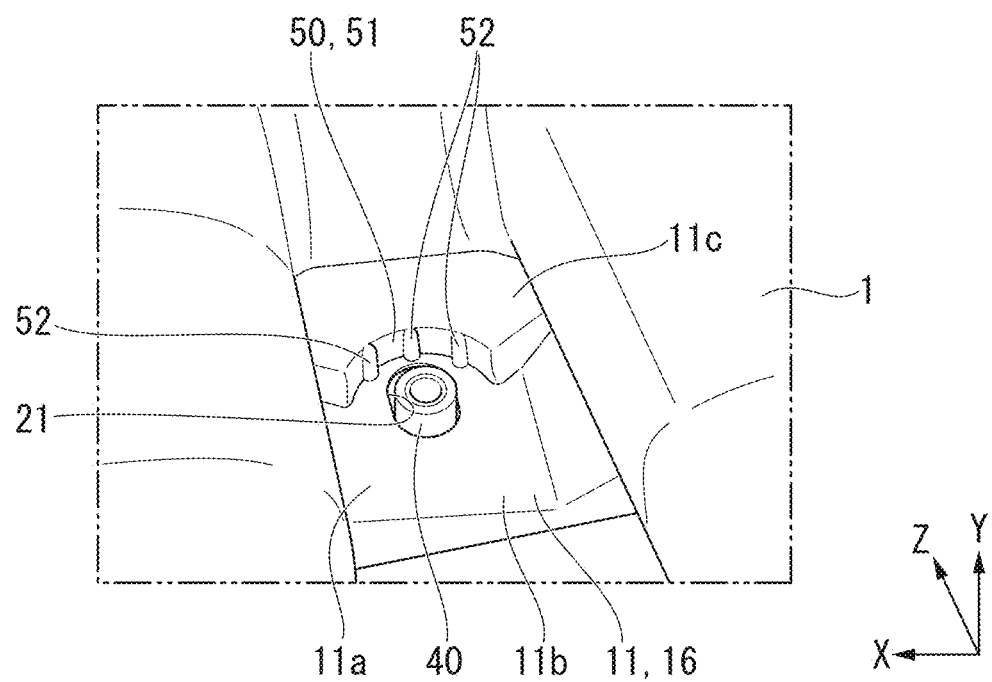
FIG. 14 is an explanatory view of an attaching operation of the interior member.

As illustrated in FIG. 14, the interior member 1 is disposed to face the attaching surface 3a of the panel 3 (refer to FIG. 2). At this time, the receiving portions 40 are inserted into the through-holes 21. In this step, the interior member 1 is disposed at a position designed in advance (refer to FIGS. 3 and 15A) (design position) with respect to the panel 3.

When disposing the interior member 1 at the design position, in some cases, an operation of displacing the interior member 1 is necessary in a state where the receiving portions 40 are inserted in the through-holes 21.

For example, when moving the interior member 1 from the position illustrated in FIG. 14 to the position illustrated in FIG. 15A, an operation of temporarily lowering (refer to an imaginary line of FIG. 6) and then raising (refer to a solid line of FIG. 6) the interior member 1 is necessary in order to avoid interference between the panel 3 and the interior member 1.

Since each of the through-holes 21 has a size that allows the up-and-down movement of the interior member 1, the operation lowering and raising the interior member 1 can be smooth performed.

Secondary Assembling Step

As illustrated in FIGS. 1, 2, 9, 10, and 15B, the shaft 32 of the fixing tool 30 is inserted into each of the receiving portions 40 and is screwed into each of the receiving portions 40. At this time, in a state where the outer circumferential edges of the heads 31 of the fixing tools 30 have abutted the protruding ends 52a and 82a of the rib-like projections 52 and 82, the fixing tools 30 are screwed into the receiving portions 40 and are fixed. Since the rib-like projections 52 and 82 are located above the heads 31, the rib-like projections abut against the heads 31 by the weight of the interior member 1.

In this manner, the interior member 1 is accurately disposed at the design position since the interior member is attached to the panel 3 while maintaining a state of being positioned with respect to the fixing tools 30.

Accordingly, the interior member 1 and the panel 3 illustrated in FIG. 1 and the like are obtained.

In the embodiment, the rib-like projections 52 and 82 abutting against the heads 31 of the fixing tools 30 are provided in the interior member 1. For this reason, the interior member 1 can be accurately disposed at a position designed in advance (design position).

In addition, the through-holes 21 of the interior member 1 are formed such that the interior member 1 is displaceable in a state where the receiving portions 40 are inserted. For this reason, an operation of disposing the interior member 1 at the design position is easy.

Therefore, according to the embodiment, the interior member 1 can be disposed at an accurate position with respect to the panel 3, and an operation of attaching the interior member 1 to the panel 3 can be easily performed.

The rib-like projections 52 and 82 are formed on the walls 50 and 80. For this reason, the strength of the rib-like projections 52 and 82 can be increased. For this reason, even in a case where a great force is applied to the rib-like projections 52 and 82 by the heads 31, deformation and damage at the rib-like projections 52 and 82 can be prevented. Accordingly, the interior member 1 can be reliably disposed at an accurate position.

The rib-like projections 52 and 82 make processing of a mold for forming the interior member 1 easy compared to a projection having a shape continuous in a circumferential direction of the head 31. For this reason, forming accuracy can be increased. Therefore, the positions of the protruding ends 52a and 82a with respect to the heads 31 can be accurately determined, and thus the interior member 1 can be disposed at an accurate position.

The wall 50 illustrated in FIG. 1 is a stepped portion formed by a difference of elevation between the bottom surface 11b and the upper surface 11c of the base portion 11. For this reason, the strength of the rib-like projections 52 can be reliably increased.

Each of the walls 80, which is a plate-like projection illustrated in FIG. 9, has an advantage in terms of freedom of design since the walls can be easily formed by design even in a case where a stepped portion cannot be formed on the base portion 11.

As illustrated in FIGS. 3 and 4, in a structure of attaching the interior member 1 to a back surface (attaching surface 3a) of the panel 3 having the opening 5, which exposes part of the interior member 1, as described above, the operation of displacing the interior member 1 in a state where the receiving portions 40 have passed through the through-holes 21 is necessary in some cases when attaching the interior member 1.

Even, in such a case, in the attachment structures 10 and 70, the interior member 1 can be disposed at an accurate position with respect to the panel 3 without impairing the easiness of an attaching operation.

In the attachment structures 10 and 70, the interior member 1 can be disposed at an accurate position with respect to the panel 3. For this reason, as illustrated in FIGS. 11 to 13, even in a case where the interior member 1 is attached with the clearance 6 with respect to the peripheral edge 5a of the opening 5 of the panel 3, the clearance 6 can be reliably secured.

The technical scope of the present invention is not limited to each of the embodiments described above, and includes the embodiments described above to which various modifications are added without departing from the spirit of the present invention. That is, configurations described in the embodiments described above are merely examples and can be modified as appropriate.

For example, although a target for attaching the interior member 1 is the panel 3 of the door 2 in each of the embodiments described above, a car body configuring member, which is a target for attaching the interior member, is not limited thereto. Examples of a car body configuring member include an instrument panel, a rear side lining, a trunk side lining, an upper pillar garnish, a lower pillar garnish, a driver lower cover, and the like.

In addition, although the rib-like projections 52 are given as examples of a movement restricting portion in each of the embodiments described above, structures of the movement restricting portions are not limited thereto. For example, also the walls 50 and 80 illustrated in FIGS. 1 and 9 alone can function as a movement restricting portion. Therefore, the walls 50 and 80 without the rib-like projections 52 can be used as a movement restricting portion.

Although a cup holder and a glove compartment are given as examples of an interior member, the interior member is not limited thereto. Examples of an interior member include an air conditioning duct, a switch housing, and the like.

DESCRIPTION OF REFERENCE NUMERALS 10, 40: attachment structure (attachment structure of interior member)
1: interior member
3: panel (car body configuring member)
3a: attaching surface (first main surface)
3b: car inside surface (second main surface)
5: opening
5a: edge of opening
6: clearance
11: base portion
11a: outer surface
21: through-hole
30: fixing tool
31: head
32: shaft
50, 80: wall
52, 82: rib-like projection (movement restricting portion)
52a, 82a: protruding end (abutting portion)
100: vehicle
110: car body

The invention claimed is:

1. An interior member configured to be attached to a car body configuring member, the interior member comprising:
a fixing tool that is configured to fix the interior member to the car body configuring member;
a base portion that has a through-hole which allows the fixing tool to pass therethrough;
a movement restricting portion that protrudes from an outer surface of the base portion, which is opposite to a surface on a car body configuring member side; and
a wall that stands from the outer surface of the base portion, wherein the wall is a stepped portion formed on the outer surface of the base portion,
wherein the fixing tool comprises
a head which is disposed on the outer surface of the base portion, and
a shaft which extends from the head and is fixed to the car body configuring member through the through-hole,
the movement restricting portion is formed to protrude from the wall,
the through-hole is formed such that the interior member is displaceable in a direction along the outer surface of the base portion within a predetermined area in a state where part of the car body configuring member or the fixing tool is inserted, and
the movement restricting portion comprises an abutting portion which restricts movement of the head in the direction along the outer surface of the base portion.

2. The interior member according to claim 1, wherein the movement restricting portion is a rib-like projection formed on the wall.

3. The interior member according to claim 1, wherein the wall is formed by a plate-like projection protruding from the outer surface of the base portion.

4. An interior member configured to be attached to a car body configuring member, the interior member comprising:
a fixing tool that is configured to fix the interior member to the car body configuring member;
a base portion that has a through-hole which allows the fixing tool to pass therethrough;
a movement restricting portion that protrudes from an outer surface of the base portion, which is opposite to a surface on a car body configuring member side; and
a wall that stands from the outer surface of the base portion,
wherein the fixing tool comprises
a head which is disposed on the outer surface of the base portion, and
a shaft which extends from the head and is fixed to the car body configuring member through the through-hole,
the movement restricting portion is formed to protrude from the wall,
the through-hole is formed such that the interior member is displaceable in a direction along the outer surface of the base portion within a predetermined area in a state where part of the car body configuring member or the fixing tool is inserted, and
the movement restricting portion comprises an abutting portion which restricts movement of the head in the direction along the outer surface of the base portion,
wherein the base portion is attached to a first main surface of the car body configuring member, and
at least part of the base portion is exposed to a second main surface side of the car body configuring member, which is opposite to the first main surface, through an opening formed in the car body configuring member.

5. The interior member according to claim 4, wherein the base portion is attached to the car body configuring member with a clearance secured over an entire periphery of a peripheral edge of the opening.

* * * * *